March 3, 1959     R. NOZTITZ     2,876,429

THEFT-PROOF CIRCUIT FOR AUTOMOTIVE VEHICLES

Filed Dec. 7, 1955

INVENTOR
ROBERTO NOZTITZ.
BY
ATTORNEYS.

United States Patent Office 2,876,429
Patented Mar. 3, 1959

2,876,429

THEFT-PROOF CIRCUIT FOR AUTOMOTIVE VEHICLES

Roberto Noztitz, Mexico City, Mexico

Application December 7, 1955, Serial No. 551,656

2 Claims. (Cl. 340—64)

This invention relates to a novel switch and electrical circuit for preventing thefts of automotive vehicles.

The purpose of the invention is to prevent and avoid thefts of automotive vehicles by eliminating the possibility of short-circuiting the power supply with the circuit to the engine, by by-passing the ignition switch.

A feature of the invention comprises a circuit having a core actuated by a low voltage coil, the coil being actuated in turn by the operation of a concealed manually operable switch.

An object of the invention is to provide a system which is more efficient, rapid and dependable for cutting off the current of the electrical circuit of the vehicle, thus assuring against short-circuiting by rendering inoperative the electrical circuit of the vehicle.

Another object of the invention resides in the simplicity of the circuit, making it easy and practical for installation, low in cost, and effective in operation, and enabling its concealment to all but the operator of the vehicle.

Other features of the invention reside in the provision that the concealed switch disconnects the battery from the remaining electrical system of the vehicle, thereby protecting the car from short-circuiting. The disconnection of the electrical circuit from the battery is capable of being effected rapidly by a single operation of a manual switch, and being connected rapidly also, by a single operation of the same switch.

A further object of the invention is to provide a signal warning means included in the theft-proof circuit so that the signal warning means directs attention to the fact that the circuit is to be disconnected when the vehicle is no longer in use, such warning means serving to limit the current to the coil of the circuit.

Other and further objects of my invention reside in the structures and arrangements hereinafter more fully described with reference to the accompanying drawings in which.

Figure 1:
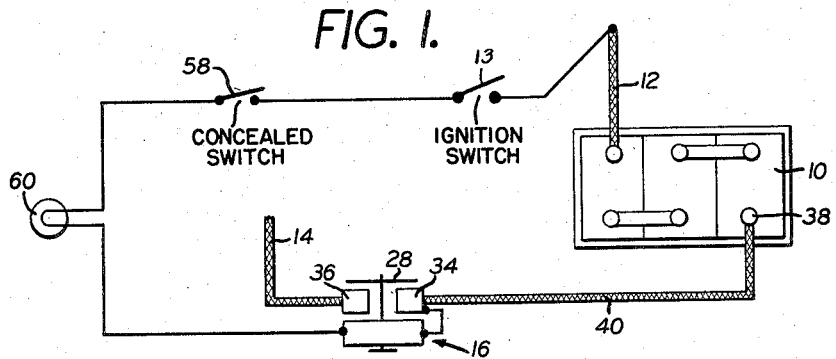
Fig. 1 is a diagram of the circuit of the invention.

Referring now to the drawings and in particular to Fig. 1 wherein a battery 10 supplies power to an electrical circuit of an automotive vehicle by way of a set of conductors 12 and 14. Such conductors are normally directly connected with the battery and generally include an ignition switch 13 placed within their circuit.

The instant invention does not eliminate the ignition switch 13 in the drawings. Its use is still required. However, by interposing a novel theft-proof circuit into cooperation with the electrical circuit of the automotive vehicle, the ends of the conductors 12 and 14 have a greater spacing than before and consequently are not susceptible to shorting as easily as are the contacts of an ignition switch. This great spacing between the conductors is such as to overcome the possibility of short circuiting by all except those who know of their location.

The novel theft-proof circuit comprises a magnetic switch generally identified by the numeral 16. The magnetic switch 16 is enclosed within a housing 18 and is composed of a hollow coil 20 having a core 22 movable longitudinally therein in response to the energization of the same. The core 22, being resiliently suspended on a spring 24 within the coil, is normally urged upwardly by the spring toward a direction out of the coil. The spring 24 is seated on an adjustable limiting member preferably a screw 26 that can be adjusted in height within the hollow of the coil 20.

The upper end of the core 22 carries an armature 28 which is freely mounted on a collar 30 secured to the core. A tension spring 32 is held against the upper surface of the armature to apply equal pressure throughout the surface of the same and cause it to move with the core upon energization of the coil into equal engagement with a pair of switch contacts 34 and 36.

The switch contacts 34 and 36 form a part of the magnetic switch 16 and are positioned between the coil 20 and the normally raised armature 28. Contact 34 is serially connected with the remaining side of the power source 10 at 38 by the conductor 40 and with one side of the coil 20 by the conductor 41. The contact 36 is directly connected with cable conductor 14 of the electrical circuit of the vehicle. Hence, a circuit completed across contacts 34 and 36 will serve to complete a circuit from the terminal 38 of the battery to the cable 14 of electrical circuit of the vehicle. Since the contacts 34 and 36 are constructed exactly alike, a description of one should suffice for both. Therefore, in Fig. 3 there is a detailed showing of the contact 36 and its connection with the conducting cable 14.

The contact 36, like contact 34, has an extended male threaded end 42 which is adapted to extend outwardly beyond the rear end of the magnetic switch housing 18. A joint 44, having a pair of female threaded surfaces 46 and 48, is joined to the male threaded end 42 at the female threaded surface 46, with a lock washer 50 secured therebetween. The cable conductor 14 having a male end threaded surface 52 is then secured to the joint 44 at the mating female threaded surface 48. Both contacts 34 and 36 thus extend outwardly beyond the rear of the magnetic switch housing 18, and are connected to their respective conductors 40 and 14 by the jointure means just disclosed.

Figure 5:
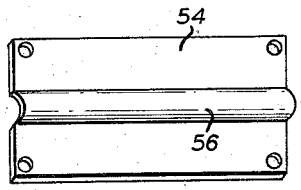
Fig. 5 is a front view of a protective cap for the cables connected with the magnetic switch.

In order to provide a complete seal and concealment for the cables and the joining connectors of the contacts 34 and 36, there is provided a cap 54 (see Fig. 5) which is adapted to be secured to the rear of the cover housing 18. Thus when the housing 18 is secured to a portion of the automotive vehicle, the cables 14 and 40, and their connectors entering the magnetic switch 16 are no longer visible to one who is unfamiliar with the theft-proof circuit thereof. The cap 54 is provided with an insulated portion 56, bowed or fashioned to embrace and completely cover the cables and their connectors.

To complete the circuit across the contacts 34 and 36, there is provided a switch 58 adapted to be concealed somewhere on the automotive vehicle. The switch 58, being manually operable between opened and closed positions, is connected in series with the conductor 12 of the automotive vehicle electrical circuit, and with the other side of the coil 20, by way of a warning or signal means 60. The warning means 60 may be a light which, when in operation, serves to limit the current transmitted to the coil 20 to prevent damage thereto.

When it is desired to operate an automotive vehicle in which the instant novel theft-proof circuit is employed, the ignition switch (not shown) is turned to energize the circuit to which it is connected. The operator of the vehicle, knowing the location of the concealed manually operable switch 58 merely throws the same to its closed position. This completes a circuit between the terminal 38 and the line 12 of the automotive vehicle electrical circuit which is connected to the opposite side of the power supply 10. The closing of the manually operable switch 58 energizes the coil 20 of the magnetic switch 16, which in turn, causes the core 22 to move downwardly thereinto, limited by the adjusted position of the stop 26 until the armature 28 is equally seated across the contacts 34 and 36. This equal seating of the armature 28 completes the circuit from the power supply 10 to conductor 14 and of the electrical circuit of the automotive vehicle, thereby permitting operation of the same.

To those who are skilled in the art, it is appreciated that it is now possible through the concealed manually operable switch 58 and the novel theft-proof circuit in which the same is incorporated, that the ends of the electrical conductors 12 and 14 of the electrical circuit of the automotive vehicle, may be so spaced as to foil the short circuiting of the same by one who is not familiar with the vericle. To those who are unfamiliar with the secret location of the switch 58, theft will be almost impossible, whereas to those who are familiar with its location, the circuit may be instantly energized by a single operation of the switch.

During the time that the concealed switch 58 is closed the series circuit to the magnetic switch 16 passes through the warning means 60. As a result, the warning means is conditioned for operation and provides a signal to the operator of the vehicle that the theft-proof circuit is closed. Thus, even when the engine of the vehicle is stopped the warning means 60 will remain in operation, by-passing the ignition switch, and signalling the necessity of disconnecting the switch 58 before leaving the vehicle.

Figure 2:
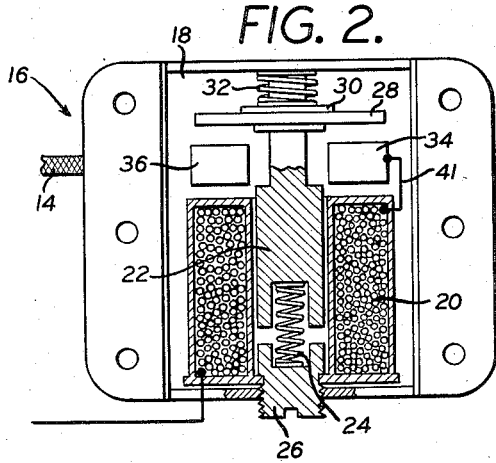
Fig. 2 is a side view of a magnetic switch included in the circuit of Fig. 1, the same being shown partially in section.
Figure 4:
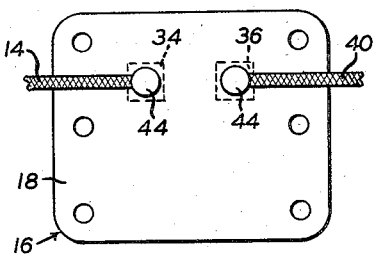
Fig. 4 is a rear view of the magnetic switch shown in Fig. 2.
Figure 3:
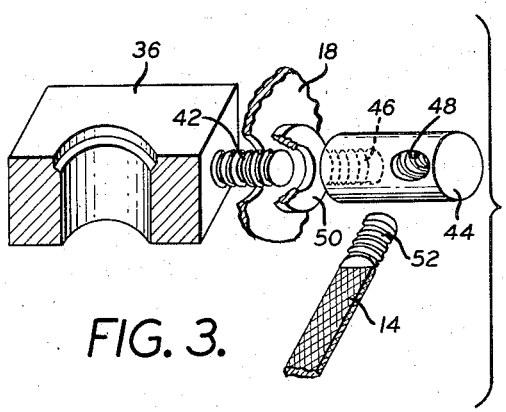
Fig. 3 shows how the terminals, making connection with the battery cables, are formed and protected for their concealment.

Although Figs. 1, 2 and 3 show details wherein the instant system may be used with the current cable or with the ground cable of the battery 10 as desired, the terminals of the solenoid coil 20 may be modified in order to be used solely in the ground cable, by leaving one of the terminals grounded in the same coil and extending not more than one insulated cable to connect the cable of the battery.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In combination with an automotive electrical circuit which includes a battery as an electrical power source and has a pair of spaced lines, one of said lines being connected to the battery, means for disconnecting the circuit from the battery comprising a conductor connected to the battery, a magnetic switch connecting the conductor to the other spaced line, said magnetic switch including a coil, a core movable in the coil by the energization of the coil and having an armature, a pair of fixed contacts engaged by the armature upon energization of the coil, one of said contacts being serially connected to the conductor, connection means between said one contact and the coil, said other contact being connected to the other of the spaced lines, an ignition switch in the other of said lines an electrical connection between the coil and the one of the spaced lines, a manually operable switch in said last named connection and disposed in a concealed position, and a signalling means in said last named connection for limiting the current transmitted to the coil and for indicating the operating condition of the magnetic switch.

2. The combination of claim 1, wherein said switch is mounted in a housing having a back wall and a removable front wall, said contacts including threaded pins extending from the back wall, sleeves threaded on the pins and having radial holes for receiving the ends of the one line and the conductor.

References Cited in the file of this patent

UNITED STATES PATENTS

| 1,260,866 | Burke | Mar. 26, 1918 |
| 1,574,513 | Ratcliff et al. | Feb. 23, 1926 |
| 1,649,936 | Van Allen | Nov. 22, 1927 |
| 2,492,077 | Wall | Dec. 20, 1949 |
| 2,517,619 | Ainley | Aug. 8, 1950 |
| 2,657,317 | Herrell | Oct. 27, 1953 |